United States Patent
Labedz

(10) Patent No.: US 8,160,019 B2
(45) Date of Patent: Apr. 17, 2012

(54) METHOD AND SYSTEM FOR IN-BAND WIRELESS BACKSTRETCH

(75) Inventor: Gerald P. Labedz, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 658 days.

(21) Appl. No.: 12/344,821

(22) Filed: Dec. 29, 2008

(65) Prior Publication Data

US 2010/0165945 A1    Jul. 1, 2010

(51) Int. Cl.
*H04W 99/00* (2009.01)
(52) U.S. Cl. ........ 370/330; 370/328; 370/338; 370/252; 455/450; 455/445; 455/447
(58) Field of Classification Search .................. 370/330, 370/328, 338, 252; 455/452.1, 450, 445, 455/447
See application file for complete search history.

(56) References Cited

U.S. PATENT DOCUMENTS

| | | | |
|---|---|---|---|
| 6,088,592 A | 7/2000 | Doner et al. | |
| 7,321,571 B2 * | 1/2008 | Schnack et al. | 370/320 |
| 2002/0077151 A1 | 6/2002 | Matthews et al. | |
| 2007/0217373 A1 * | 9/2007 | Kotzin et al. | 370/338 |
| 2007/0218910 A1 * | 9/2007 | Hill et al. | 455/445 |
| 2007/0265013 A1 * | 11/2007 | Labedz | 455/450 |

FOREIGN PATENT DOCUMENTS

WO    2005015924 A1    2/2005

* cited by examiner

*Primary Examiner* — Ricky Ngo
*Assistant Examiner* — Rasheed Gidado

(57) ABSTRACT

Disclosed are a method and system for transmitting and receiving traffic, by a plurality of backhaul collector sites, to and from transceivers associated with sectors of a backhaul frequency reuse plan using a backhaul portion thereof. The method and system further transmit and receive traffic, at a backstretch super collector site of a backstretch cell, to and from alternate or a subset of backhaul collector sites of the plurality of backhaul collector sites surrounding the backstretch collector site.

9 Claims, 9 Drawing Sheets

METHOD AND SYSTEM FOR IN-BAND WIRELESS BACKSTRETCH

BACKGROUND

1. Technical Field

The present invention generally relates to mobile communication systems and, in particular, to a method and system to effectively backhaul data from microcells to backhaul cells and then to larger backstretch cells using frequency bands of a microcell frequency reuse plan.

2. Description of the Related Art

IEEE (Institute of Electrical and Electronics Engineers) 802.16-based systems, such as 802.16e WiMAX (Wireless Maximize) systems, have cells (hereinafter referred to as "microcells") with relatively small cell radii. In wireless systems, such as a cellular-type application, a relatively large number of radio sites require connection to a larger terrestrial network, the connections may be wired or wireless. Backhaul connections can be used to connect the radio sites to the terrestrial network which requires substantial startup expense.

Various wireless approaches have been proposed to reduce startup costs associated with the transmission of backhaul traffic. A first approach multiplexes backhaul traffic from several radio sectors at a site and then use a much higher speed transmission from the site to backhaul the traffic to yet another site. The backhaul traffic requires additional multiplexing hardware, high bandwidth radios and a separate or dedicated frequency band. In a second approach the backhaul traffic from several sites is multiplexed to one master site using a frequency band wide enough to multiplex several sites worth of traffic. However, this type of approach may require a very fast Media Access Control (MAC) protocol.

Accordingly, it would be desirable to have a method and system to effectively backhaul data from microcells to backhaul cells and then to larger backstretch cells using frequency bands of a microcell frequency reuse plan.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
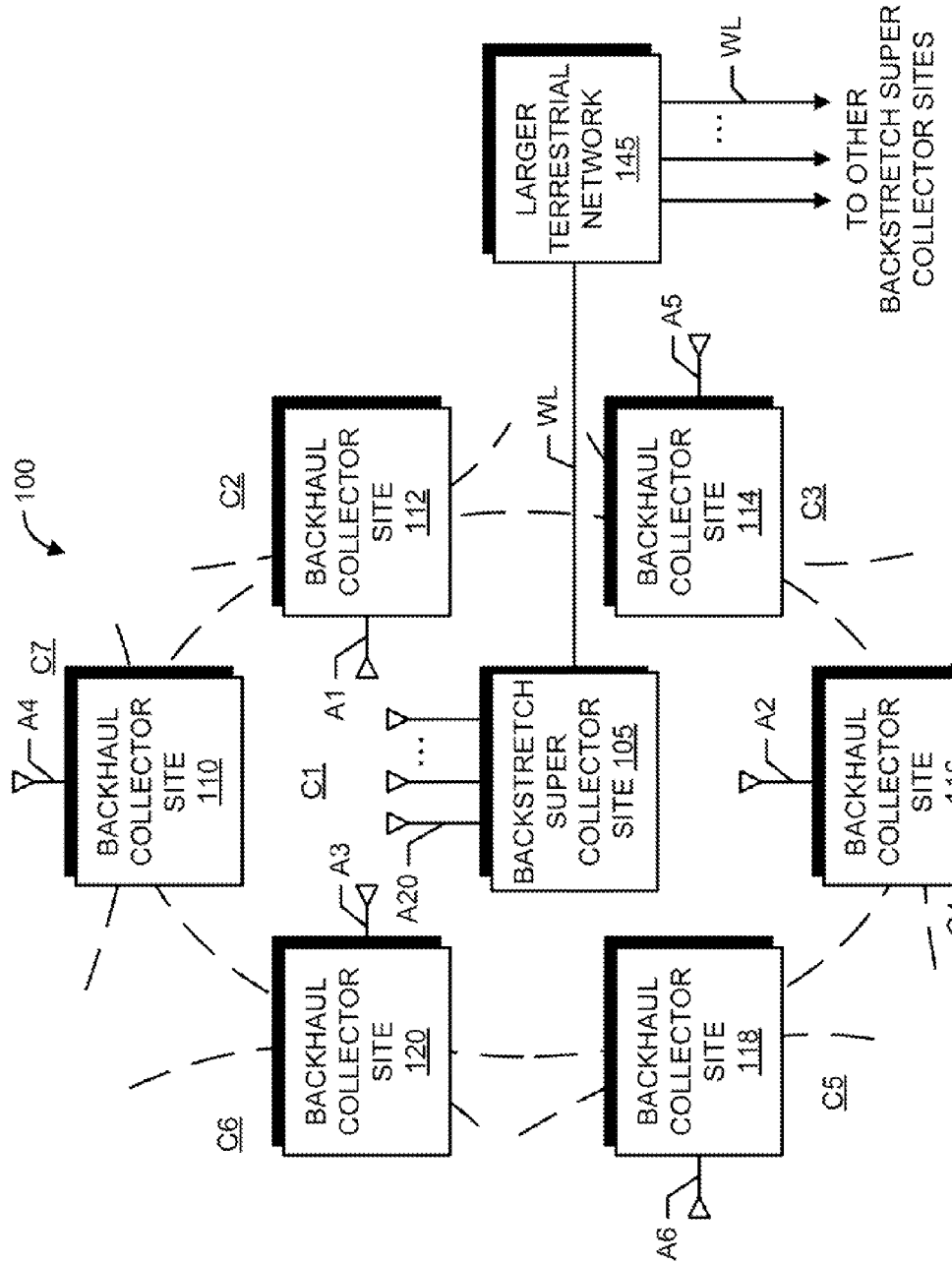
FIG. 1 is a block diagram of a wireless communication system in accordance with one or more embodiments of the present invention.

The illustrative embodiments provide a method and system for transmitting and receiving traffic, by a plurality of backhaul collector sites, to and from transceivers associated with sectors of a backhaul frequency reuse plan using a backhaul portion thereof. The method and system further include transmitting and receiving traffic, at a backstretch super collector site in each backstretch cell, to and from alternate or a subset of backhaul collector sites of the plurality of backhaul collector sites surrounding the backstretch collector site for each backstretch cell.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention. It should be understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

FIG. 1 is a block diagram of a wireless communication system 100 in accordance with one or more embodiments of the present invention. At present, standards bodies such as OMA (Open Mobile Alliance), 3GPP (3rd Generation Partnership Project), 3GPP2 (3rd Generation Partnership Project 2) and IEEE 802 are developing standards specifications for wireless telecommunications systems. Wireless communication system 100 has an architecture compatible with the IEEE 802.16 specification for carrying out methods and processes described herein. Alternative embodiments of the present invention may be implemented in communication systems that employ other or additional technologies such as, but not limited to, those described in the other IEEE 802 specifications, the 3GPP specifications and/or those described in the 3GPP2 specifications.

In FIG. 1, system 100 includes a plurality of backstretch super collector sites, only super collector site 105 shown to connect to a larger terrestrial network 145 via a plurality of wire lines WL, respectively. The wire lines WL may include wire or fiber. Nonetheless, the wire lines WL may be substituted with a wireless connection. Only one backstretch super collector site 105 will be described in detail Super collector site 105 is surrounded by a set of backhaul collector sites. In the illustration, super collector site 105 is surrounded by backhaul collector sites 110, 112, 114, 116, 118 and 120. Super collector site 105 is generally located within at the center of backstretch cell C1. A boundary of backstretch cell C1 is generally defined by the surrounding backhaul collector sites 110, 112, 114, 116, 118 and 120. Backhaul collector site 112, 116 and 120 on the boundary of backstretch cell C1 points a single link from antennas A1, A2 and A3, respectively, toward super collector site 105 in backstretch cell C1 while other remaining backhaul collector sites 110, 114 and 118 point a single link toward super collector sites in adjacent backstretch cells C7, C3, and C5, respectively. The cells adjacent backstretch cell C1 include backstretch cells C2, C3, C4, C5, C6 and C7. In the embodiment of FIG. 1, the backhaul collector sites 112, 116 and 120 on the boundary of backstretch cell C1 are every other or alternating backhaul collector sites of the set of backhaul collector sites 110, 112, 114, 116, 118 and 120 surrounding super collector site 105. Nonetheless, a different subset of the backhaul collector sites surrounding the super collector site 105 may be used.

In the illustration, there are three remaining alternate backhaul collector sites 110, 114, and 118, pointing away from backstretch super collector site 105. Remaining alternating backhaul collector sites 110, 114 and 118 point the single link from antennas A4, A5 and A6, respectively, to super collector sites of immediately adjacent backstretch cells C7, C3 and C5, respectively.

The frequency plan of the backstretch cell C1 uses a separate band from the bands of the microcell frequency reuse plan. Nonetheless, the frequency plan of the backstretch cell C1 may reuse at least one band of a microcell frequency reuse plan of a base microcell layer. In the example, the microcell frequency reuse plan uses three frequency bands. Thus, the single link from each backhaul collector site 112, 116 and 120 utilizes a different one of the frequency bands of the microcell frequency reuse plan or at least one separate band. For a three frequency band example, backhaul collector site 112 may use a first frequency band; backhaul collector site 116 may use a second frequency band; and backhaul collector site 120 may use a third frequency band.

Backstretch super collector site 105 includes a backstretch antenna system having one or more directional antennas A20. Each directional antenna is configured to receive a different frequency band or time slot. In one configuration, for three frequency bands, three antennas A20 are provided, each pointing in the appropriate direction to receive the different frequency bands from backhaul collector sites 112, 116 and 120, respectively. In one embodiment, there may be one backhaul collector site in a backstretch cell assigned to use a respective one microcell frequency of the microcell frequency reuse plan to transmit and receive backhaul traffic to super collector site 105. However, other frequency assignments using the microcell frequency reuse plan may be used.

In one configuration, each backhaul collector site 112, 116 and 120 may communicate using the same frequency band but using a different time slot.

In an alternate configuration, depending on system characteristics, the backstretch antenna system may include a single omni-directional antenna used in place of the three antennas A20 to receive the frequency bands from each backhaul collector site 112, 116 and 120. Furthermore, as some frequencies point in the same direction, cross-polarization techniques could be used to reduce interferences (e.g., desired-to-interfering signal ratio). Nonetheless, other antenna configurations may be used.

For the exemplary set of backhaul collector sites, backhaul collector site 110 is located 180 degrees from backhaul collector site 116 on a common or shared boundary of backstretch cell C1. The antennas A4 and A2 of backhaul collector site 110 and backhaul collector site 116, respectively, also propagate in opposite directions in backstretch cells C7 and C1, respectively.

Backstretch cell C3 is adjacent to backstretch cell C1. Backhaul collector site 114 points a single link via antenna A5 to a backstretch super collector site of cell C3 (not shown). Backhaul collector site 114 is adjacent to backhaul collector site 112 both of which are shown on the boundary of backstretch cell C1. Antennas A1 and A5 of backhaul collector site 112 and backhaul collector site 114 propagate in opposite or differing directions. For example, for a hexagon cell shape, the directions may be displaced by the difference between a faces of a hexagon and approximately 180° (i.e., 180°−60°=120°). The differing directions may vary based on the cell shape and the pointing direction of the antennas. Backhaul collector site 118 is adjacent to backhaul collector site 120 both of which are shown on a common boundary of backstretch cell C1. Antennas A6 and A3 of backhaul collector site 118 and backhaul collector site 120, respectively, propagate in opposite or differing directions.

Figure 2A:
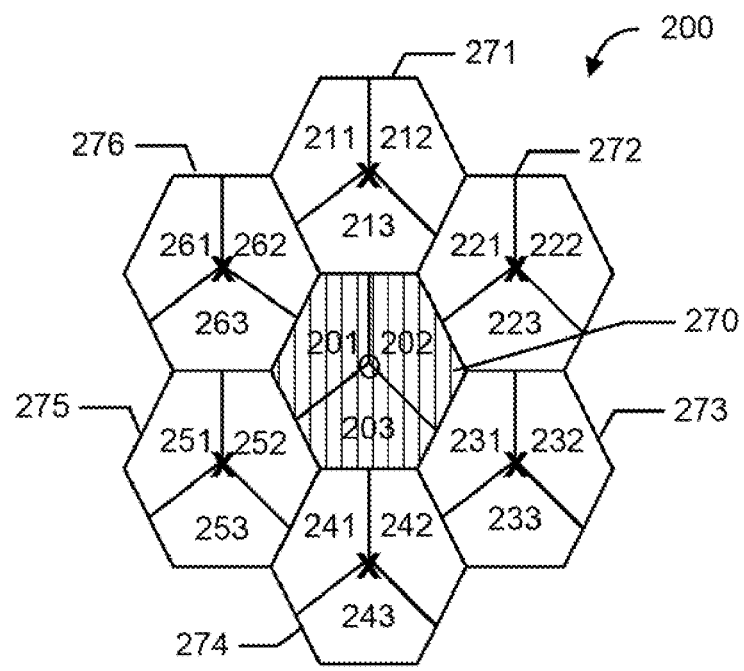
FIG. 2A is a block diagram of a microcell frequency reuse plan of a 1:3:3 pattern for a base microcell layer in accordance with one or more embodiments of the present invention.

FIG. 2A is a block diagram of a microcell frequency reuse plan 200 of a 1:3:3 pattern for a base microcell layer in accordance with one or more embodiments of the present invention. The microcell frequency reuse plan 200 includes a plurality of microcells 270, 271, 272, 273, 274, 275 and 276. The "X" in the center of each of the microcell 271, 272, 273, 274, 275 and 276 represents a neighbor (or adjacent) cell collector site of the microcell, as will be described in more detail later. The "O" at the center of microcell 270 represents a backhaul collector site, such as backhaul collector sites 110, 112, 114, 116, 118 or 120, of FIG. 1.

For the 1:3:3 pattern of microcell frequency reuse plan 200, each microcell uses three unique frequency bands including a first, a second and a third frequency band. Sectors of each cell that are labeled with a reference number ending in a "1" use the first frequency band, sectors labeled with a reference number ending in a "2" use the second frequency band, and sectors labeled with a reference number ending in a "3" use the third frequency band. The second digit in a sector's reference number corresponds to a last digit of the cell's reference number. For example, for microcell reference number 271 the corresponding sector reference numbers are 211, 212 and 213.

Microcell 270 includes sectors 201, 202, and 203. Microcell 270 is shown hatched with a vertical pattern to denote a center microcell with a backhaul collector site. Neighbor microcell 271 includes sectors 211, 212, and 213. Neighbor microcell 272 includes sectors 221, 222, and 223. Neighbor microcell 273 includes sectors 231, 232, and 233. Neighbor microcell 274 includes sectors 241, 242, and 243. Neighbor microcell 275 includes sectors 251, 252, and 253. Neighbor microcell 276 includes sectors 261, 262, and 263.

Figure 2B:
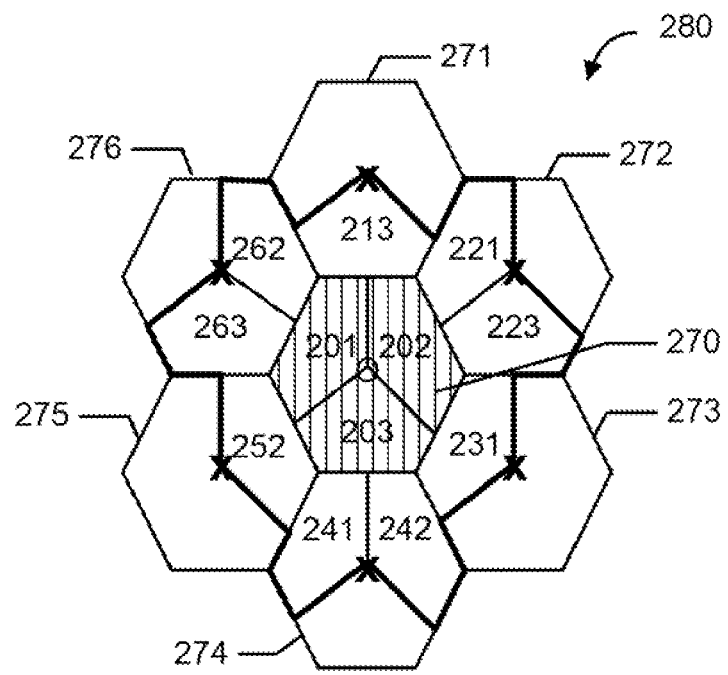
FIG. 2B is a block diagram of a backhaul cell for an intermediate backhaul layer of the 1:3:3 pattern in accordance with one or more embodiments of the present invention.

FIG. 2B is a block diagram of a backhaul cell 280 for an intermediate backhaul layer of the 1:3:3 pattern. Backhaul cell 280 is configured to reuse the frequency bands of the microcell frequency reuse plan 200 of FIG. 2A. Backhaul cell 280 includes the centrally located microcell 270 (shown hatched with a vertical pattern) with three sectors 201, 202 and 203 and the immediately adjacent sectors of the surrounding neighbor (adjacent) microcells 271, 272, 273, 274, 275 and 276. The sector reference numerals of those sectors belonging to adjacent backhaul cells and which are not part of backhaul cell 280 have been removed. Here, there are six neighbor (adjacent) microcells 271, 272, 273, 274, 275 and 276 adjacent to the microcell 270. Each neighbor microcell 271, 272, 273, 274, 275 or 276 transmits and receives backhaul traffic for one or two of their respective sectors to and from the backhaul collector site (denoted by an "O") in the center of microcell 270. As can be seen, the backhaul traffic from each sector is transmitted and received using the frequency band (more specifically, the backhaul portion of the frequency band) associated with that individual sector. For example, in operation, a neighbor cell collector site of neighbor microcell 271, denoted by an "X", sends the backhaul traffic of sector 213 on the third frequency band using a backhaul portion thereof to the backhaul collector site of microcell 270. A neighbor microcell collector site of neighbor microcell 272, denoted by an "X", employs the backhaul portion of the first and third frequency bands of sectors 221 and 223 to transmit and receive the backhaul traffic to the backhaul collector site of microcell 270. A neighbor cell collector site of neighbor microcell 273, denoted by an "X", sends the backhaul traffic of sector 231 on the first frequency band using a backhaul portion thereof to the backhaul collector site of microcell 270. A neighbor microcell collector site of neighbor cell 274, denoted by an "X", employs the backhaul portion of the first and second frequency bands of sectors 241 and 242 to transmit and receive the backhaul traffic to the backhaul collector site of microcell 270. A neighbor cell collector site of neighbor microcell 275, denoted by an "X", sends the backhaul traffic of sector 252 on the second frequency band using a backhaul portion to the backhaul collector site of microcell 270. A neighbor cell collector site of neighbor microcell 276, denoted by an "X", employs the second and third frequency bands of sectors 262 and 263 to transmit and receive the backhaul portion to the backhaul collector site of microcell 270. The backhaul frequency reuse pattern is disclosed in application Ser. No. 11/434,312, entitled "METHOD AND APPARATUS FOR PROVIDING IN-BAND WIRELESS BACKHAUL," assigned to the same assignee. The frequency reuse plan in the backhaul cell 280 is compatible with 802.16-based systems, such as 802.16e WiMAX (Wireless Maximize) systems, which have relatively small cell radii.

Figure 3:
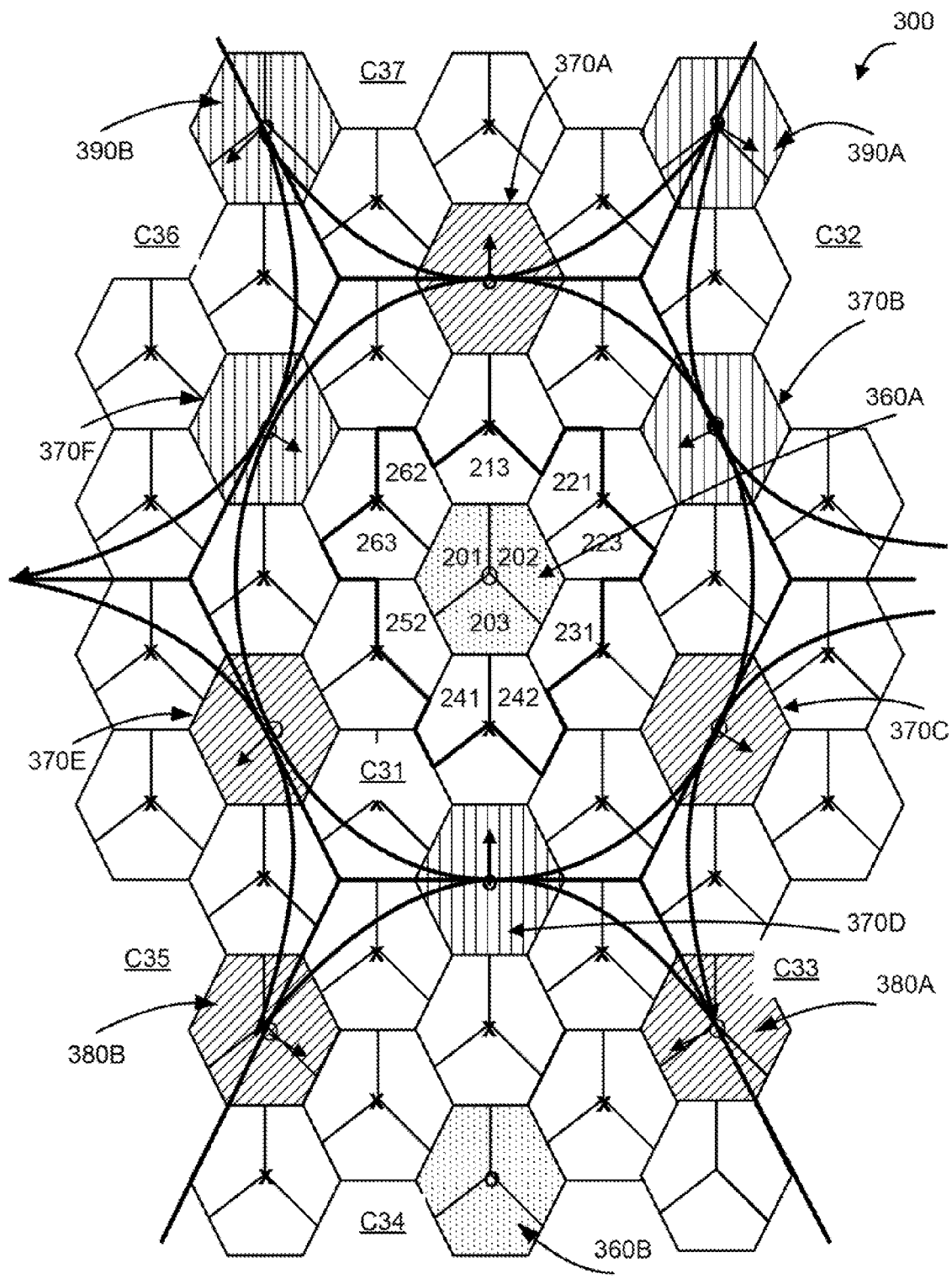
FIG. 3 is a block diagram of a backstretch cell plan for a third backstretch layer of the 1:3:3 pattern in accordance with one or more embodiments of the present invention.

FIG. 3 is a block diagram of a backstretch cell plan 300 for a third backstretch layer of the 1:3:3 pattern in accordance with one or more embodiments of the present invention. backstretch cell plan 300 includes a plurality of backstretch cells C31, C32, C33, C34, C35, C36 and C37 of which only backstretch cell C31 is shown in full and backstretch cells C32, C33, C34, C35, C36 and C376 are partially shown.

A backstretch cell, such as backstretch cell C31 includes at its center a center backhaul cell 360A with the center microcell of backhaul cell 360A shown hatched with a dotted pattern. The backhaul cell 360A overlaps the backstretch cell C31. The center backhaul cell 360A is surrounded by a plurality of neighbor (or adjacent) backhaul cells 370A, 370B, 370C, 370D, 370E and 370F on a shared boundary of backstretch cell C31. The center microcell of the backhaul cells 370A, 370B, 370C, 370D, 370E and 370F is shown hatched with either a vertical or diagonal pattern. The plurality of neighbor (or adjacent) backhaul cells 370A, 370B, 370C, 370D, 370E and 370F transmit and receive backhaul traffic to and from the center microcell and surrounding sectors as described in FIG. 2B covered by a respective backhaul cell. On the boundary of cell C31 there are six neighbor (or adjacent) backhaul cells 370A, 370B, 370C, 370D, 370E and 370F. The reference numeral for backhaul cells 370A, 370B, 370C, 370D, 370E and 370F is shown pointing to the center microcell having the backhaul collector site denoted with an "O". The center microcell of backhaul cells 370B, 370D, and 370F is shown vertically hatched and includes the backhaul collector site of the backhaul cell. Backhaul cells 370B, 370D, and 370F are in communication with the backstretch collector site of backstretch cell C31 located in the center microcell (shown hatched with a dotted pattern). Each of the other remaining backhaul cells 370A, 370C, and 370E has a corresponding center microcell shown diagonally hatched. The other remaining backhaul cells 370A, 370C, and 370E direct the collected backhaul traffic into backstretch cells C37, C33 and C35, respectively.

Backstretch traffic is the backhaul traffic collected and retransmitted to the center of a backstretch cell, (e.g. backstretch cell C31) from every other neighboring (or adjacent) backhaul cell of the set of backhaul cells on the sharing a boundary with the center backstretch cell. Thus, the backhaul traffic of backstretch cell C31 is collected from neighbor backhaul cells 370B, 370D, and 370F as well as the traffic collected in (center) backhaul cell 360A.

Backhaul cell 360B (with a center microcell shown hatched with a dotted pattern) will serve as the center of backstretch cell C34. Likewise, neighbor backhaul cells 380A and 380B (with a center microcell shown diagonally hatched) collect backhaul traffic and retransmit the collected backhaul traffic to a backstretch collector site, denoted by an "O", at the center of backhaul cell 360B. Backhaul traffic from backhaul cell 390A on the boundary of cell C32 and C37 is transmitted and received in backstretch cell C32. Backhaul traffic from backhaul cell 390B on the boundary of cell C37 and C36 is transmitted and received in backstretch cell C36.

Backstretch cell C31 receives user or access traffic in the microcell having sectors labeled 201, 202 and 203, backhaul traffic from sectors 201, 202, 203, 213, 221, 223, 231, 241, 242, 252, 262 and 263 and backstretch traffic from every other surrounding backhaul cell (backhaul collector site) reusing the microcell frequency reuse plan by using the backhaul portions of the frequency bands or at least one separate band different from the bands of the microcell frequency reuse plan.

Backstretch cells are super cells created by skipping every other neighbor backhaul collector site and making a center backhaul collector site surrounded by a plurality of neighbor backhaul collector sites as the backstretch collector site. Nonetheless, other subsets of backhaul collector sites may be used in lieu of an arrangement that skips every other neighbor backhaul collector site.

In one configuration, the communication of backhaul traffic to a backstretch collector site may use at least three sub-bands, one each for the neighbor backhaul collector sites surrounding the backstretch super collector site. In the example, there would be three sub-bands surrounding a super collector site. The three frequencies can be repeated in each backstretch super cell pattern pointing to the centrally located backstretch super collector site. The configuration using sub-bands would be a point-to-point (PP) mode of transmission.

Having the backstretch, backhaul and user traffic share the same microcell frequency reuse plan and/or sub-bands can eliminate the need to license additional bands for wireless backhaul and backstretch traffic. Moreover, utilizing a portion of the existing, in-band orthogonal channels may be more spectrally efficient than using a separate radio in the same band.

The backstretch super cell pattern and system 100 are compatible with in-band to out-of-band wireless backhaul systems, as long as that the frequency set is configured to not cause interference with the backstretch cell frequency plan.

Figure 4:
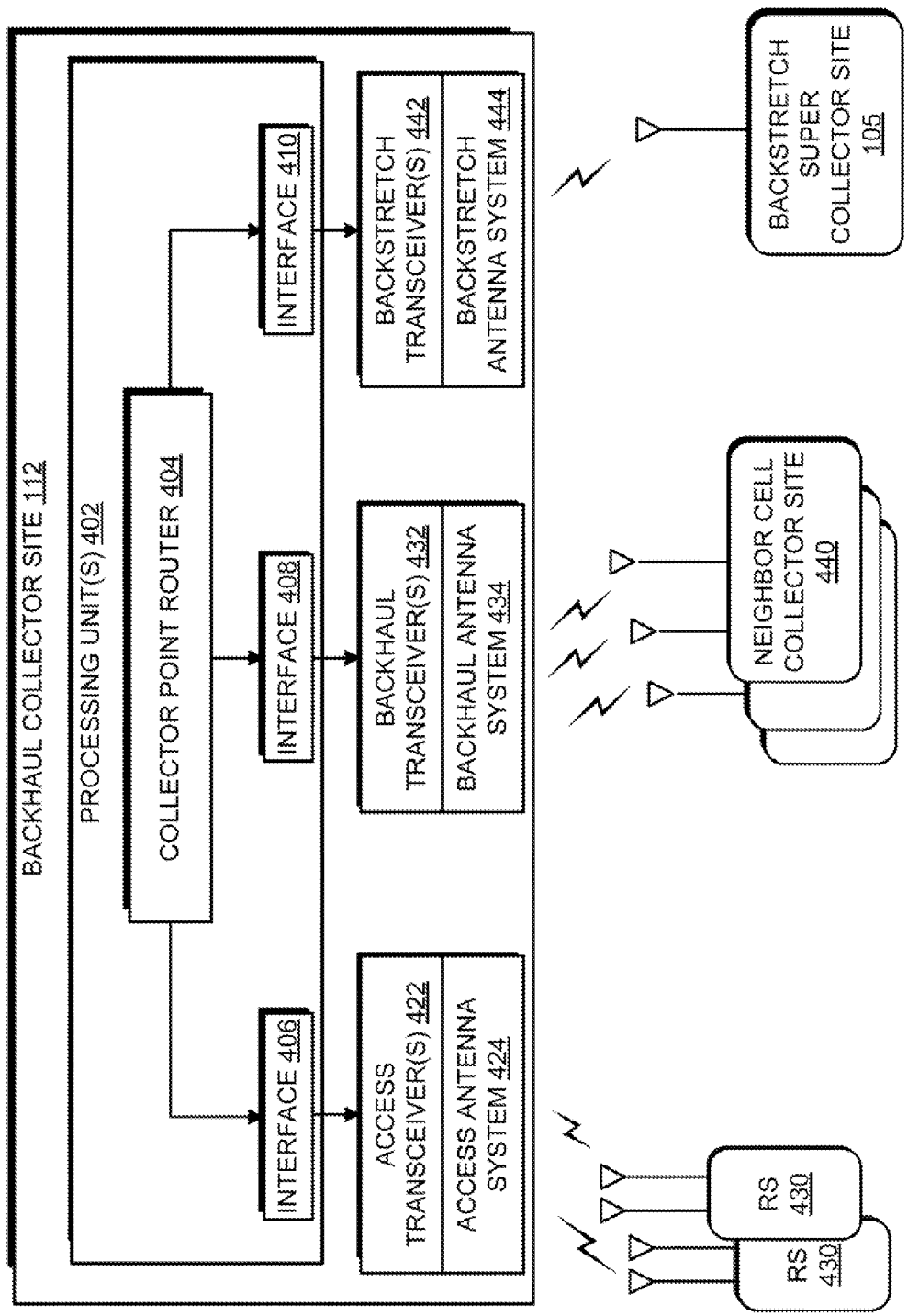
FIG. 4 is a block diagram of a backhaul collector site in accordance with one or more embodiments of the present invention.

FIG. 4 is a block diagram of backhaul collector site 112 in accordance with one or more embodiments of the present invention for use in system 100 as previously described in relation to FIG. 1. Backhaul collector site 112 includes processing unit(s) 402 operable to execute a set of instructions for carryout the functions described herein. The processing unit(s) 402 includes a collector point router 404 and a plurality of interfaces 406 and 408. Interfaces 406 and 408 are coupled to access transceiver(s) 422 and backhaul transceiver(s) 432, respectively.

Access transceiver(s) 422 are coupled to access antenna system 424 configured to communicate access traffic to and from one ore more remote stations (RS) 430. Backhaul transceiver(s) 432 are coupled to backhaul antenna system 434 configured to communicate backhaul traffic from neighbor cell collector sites 440. An example of an access antenna system 422 and backhaul antenna system 434 are also disclosed in application Ser. No. 11/434,312, entitled "METHOD AND APPARATUS FOR PROVIDING IN-BAND WIRELESS BACKHAUL," assigned to the same assignee. Backhaul collector site 112 and neighbor cell collector sites 440 may each represent a base transceiver station (BTS), an access point (AP), and/or a higher order device such as a wideband base station (WBS) or WLAN (wireless local area network) station or even a radio access network (RAN) or access network (AN). Neighbor cell collector sites 440 are those neighbor cell collector sites represented as an "X" in FIGS. 2A, 2B and 3 for a single backhaul cell 280.

RSs 430 are shown communicating via technology-dependent, wireless interfaces such as the 802.16e air interface. RSs 430 are those remote stations that currently reside in the microcell covered by backhaul collector site 112. For example, in reference to FIG. 2B, the microcell corresponds to cell 270 shown vertically hatched.

Backhaul collector site 112 further includes interface 410 coupled to backstretch transceiver 442. Backstretch transceiver 442 is coupled to backstretch antenna system 444 and may include a single transceiver. Backhaul collector site 112 communicates with backstretch super collector site 105 using a single narrowbeam using a respective one frequency band. backstretch antenna system 444 employs a directional antenna directed in the direction of backstretch super collector site 105 using a respective one frequency band.

Processing unit(s) 402 and transceiver(s) 422 and 432 and 442 are well-known. For example, processing unit(s) 402 may comprise one or more microprocessors, microcontrollers, memory devices, application-specific integrated circuits (ASICs), and/or logic circuitry. Processing unit(s) 402 may be configured to implement algorithms and/or protocols using computer readable instructions embedded in a computer readable medium.

Figure 5:
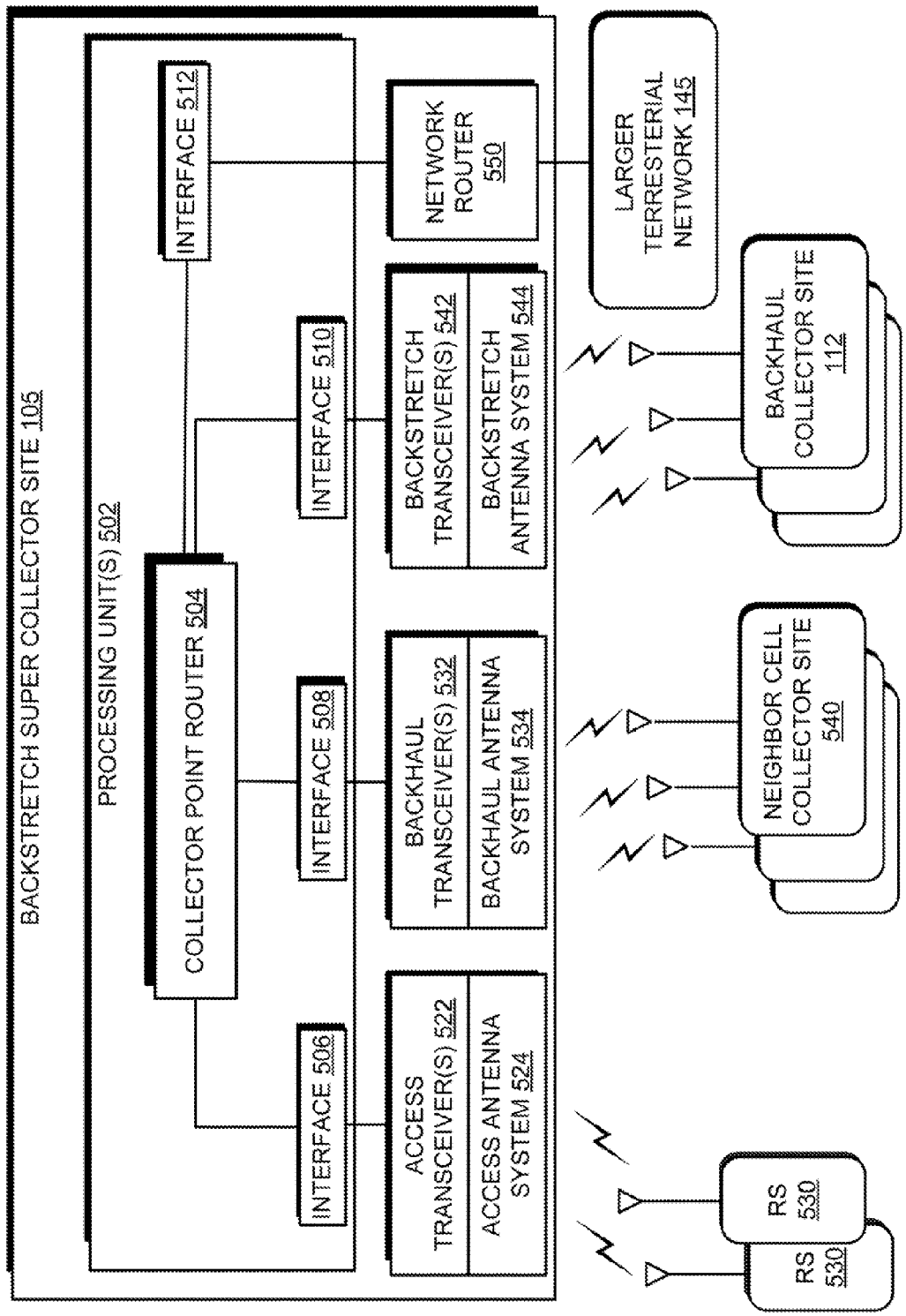
FIG. 5 is a block diagram of a backstretch super collector site in accordance one or more embodiments of the present invention.

FIG. 5 is a block diagram of backstretch super collector site 105 in accordance one or more embodiments of the present invention for use in system 100 as previously described in relation to FIG. 1. Backstretch super collector site 105 includes processing unit(s) 502 operable to execute a set of instructions for carryout the functions described herein. Processing unit(s) 502 includes collector point router 504 and a plurality of interfaces 506, 508 and 510. Interfaces 506, 508 and 510 are coupled to access transceiver(s) 522, backhaul transceiver(s) 532, and backstretch transceiver(s) 542.

Access transceiver(s) 522 are coupled to access antenna system 524 configured to communicate access traffic to and from one or more remote stations (RS) 530 using a microcell frequency reuse plan. Backhaul transceiver(s) 532 are coupled to backhaul antenna system 534 configured to communicate backhaul traffic to and from neighbor cell collector sites 540. Neighbor cell collector sites 540 are those neighbor cell collector sites represented as an "X" in FIG. 3 for a centrally located backhaul cell. Backstretch transceiver(s) 542 receive and transmit collected backhaul traffic from backhaul collector sites (e.g., backhaul collector sites 112, 116, 120) of a backstretch cell. The physical layer of backstretch transceiver(s) 542 can used either a point-to-multipoint mode (PMP) or in the point-to-point (PP) mode.

A physical layer design for the backstretch cell may include an Orthogonal Frequency Division Multiplex (OFDM) design compatible with IEEE 802.16 standards and would function in the PMP mode. Each of the plurality of backhaul collector sites (e.g., backhaul collector sites 112, 116, 120) surrounding backstretch super collector site 105, can be allocated an amount of traffic commensurate with its needs, that is, the frequency bands (e.g., first, second and third bands) need not consume the same amount of time and frequency resource on the OFDM physical layer. The first, secondary and/or third frequency bands that are used in the backstretch cell can be modified for usage needs. In the design an appropriate modulation order, coding, etc. would be selected and then adjusted to carry the necessary traffic for all backhaul collector sites associated with a backstretch cell based on time and frequency allotments. By using an OFDM-type physical layer, the guard band waste encountered by using a plurality of contiguous frequency bands, for a plurality of backhaul collector sites (e.g., backhaul collector sites 112, 116, 120) going to one of backstretch super collector site 105, is avoided. The PMP mode does not require any media access control (MAC), so there is no MAC overhead loss, additional jitter or delay due to collisions. Quality of Service (QoS) is dependent only on link quality. The system design is compatible with diversity and other link quality improvement techniques. While a MAC is not required in the preferred embodiment, the backstretch frequency plan is consistent with systems using a MAC. Thus, the system eliminates the need for a MAC layer.

The MAC layer can be eliminated for the OFDM design and a frequency division multiple access (FDMA) design. The traffic from each backhaul collector site may have exclusive use of a frequency. Therefore, no MAC layer is needed to arbitrate the traffic.

In TDMA and OFDM systems, each backhaul collector site must have an assigned time slot for TDMA or time slot and frequency for OFDM to get rid of the MAC layer. The assigned time slot and/or frequency (or resource allocation) would be provided in advance at the time the system is designed. The resource allocation is a function of the amount of traffic to be brought from a particular backhaul collector site to the backstretch super collector site. In a FDMA system, the separation for the backhaul collector sites is a function of the different frequency assignments to each backhaul collector site pointed at the backstretch super collector site.

In another configuration, The MAC layer could be used by employing a contention system set up, via a MAC layer, for resources in TDMA or OFDM embodiments. Thus, the MAC layer does not need to be excluded. However, the MAC layer wastes valuable bandwidth. Predefined resource allocation may be somewhat wasteful. However, the waste of predefined resource allocation can be mitigated with advance reservation of allocated resources, such as to accommodate for times of the day when cells carry the same amount of traffic. Nonetheless, in order to reduce the cost of the system, eliminating the MAC layer is a factor. The system cost is further reduced by minimizing the hardwiring of all the microcells.

RSs 530 are shown communicating via technology-dependent, wireless interfaces such as the 802.16e air interface. RSs 530 are those remote stations that currently reside in the microcell covered by backstretch collector site 105. For example, in reference to FIG. 3, the microcell corresponds to cell 360A (shown hatched with a dotted pattern) and uses the microcell frequency reuse plan.

RSs 430 and 530 may include user or subscriber stations using one or more of consumer electronic platforms such as, but not limited to, cellular phones, mobile stations, access terminals (ATs), terminal equipment, mobile devices, gaming devices, personal computers, and personal digital assistants (PDAs).

Backhaul collector site 112 collects backhaul traffic from 12 sectors. Additionally, the backhaul transceiver(s) 532 collect traffic from 12 sectors associated with the center of a backstretch cell. Backstretch super collector site 105 also collects the backhaul traffic of a plurality (three) backhaul collection sites, plus itself (the 12 sectors) for a total of 12+3×12=48 sectors. In the exemplary configuration, the backhaul traffic of generally 16 microcell sites are bundled together.

Advantages of the system 100 is that for a 1:3:3 pattern only one in 16 collector sites (which include neighbor cell collector sites and backhaul collector sites) need be connected to the larger system via wire, fiber, or yet another wireless connection. An OFDM design for a backstretch physical layer may provide better spectral efficiency than using separate frequency bands. Additionally, a OFDM design is more efficient as the design allows non-equal traffic from each backhaul collector site. Since all backhaul collector sites associated with a single backstretch super collector site are roughly at the same distance away, time alignment for a Time Division Duplex (TDD) system will be relatively simply to apply. While an OFDM design is preferred, the system 100 is compatible with separated frequency bands for the path from the collection points to the super collector sites. These frequency bands do not need to be contiguous.

The backhaul frequency reuse plan for traffic collection/dissemination over 48 sectors, uses at least an 802.16 OFDM physical layer (modulation, coding, Time Division Multiplexing (TDM), Frequency Division Multiplexing (FDM)) for the backhaul traffic. The system may use stationary Non-Line of Site (NLOS) for the backhaul traffic. Nonetheless, other physical layer designs could be used. There may be insertion loss for backhaul traffic signals. However, the system design does not require accommodations for fade margin, etc. Additionally, as previously described, cross polarization may be used to mitigate interference from/to mobile stations or remote stations. Thus, the system design is simple with no mesh, no MAC, no jitter or significant delay, and is adapted for 1:3:3, 1:4:2 and 1:6:6 frequency reuse patterns.

Backstretch super collector site 105 further includes interface 512 coupled to processing unit(s) 502 and network router 550 to route backhaul traffic collected at the backstretch super collector site 105 to lager terrestrial network 145. Backstretch super collector site 105 collects the collected traffic from four backhaul cells (one backhaul cell is at the center of the corresponding backstretch cell) for bundling the traffic for wired connections or other connections to larger terrestrial network 145.

Figure 6A:
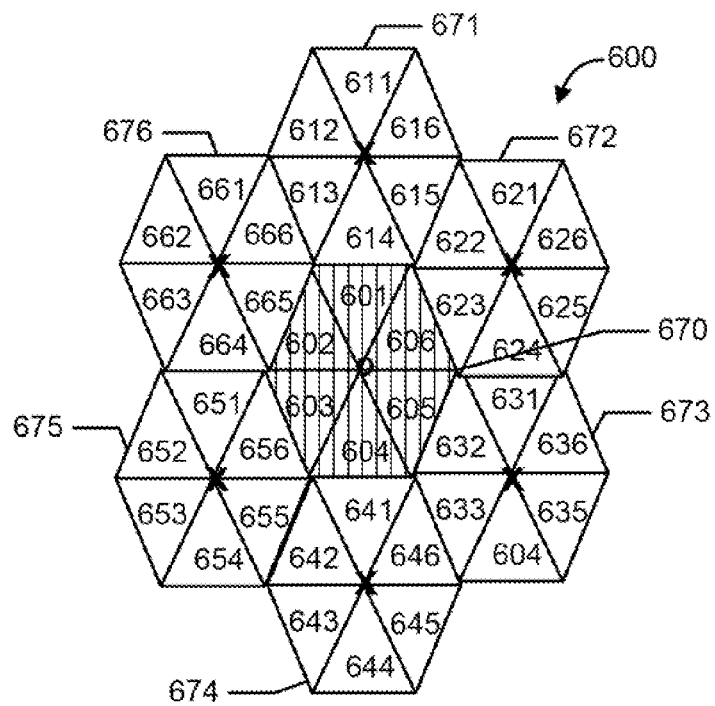
FIG. 6A is a block diagram of a microcell frequency reuse plan of a 1:6:6 pattern for a base microcell layer in accordance with one or more embodiments of the present invention.

FIG. 6A is a block diagram of a microcell frequency reuse plan 600 of 1:6:6 for a base microcell layer in accordance with one or more embodiments of the present invention. Microcell frequency reuse plan 600 represents another alternative frequency plan with the addition of a backhaul collector cell (shown by the "O" at the center of a microcell). The center microcell 670 is shown hatched with vertical lines and serves as the center of a backhaul cell. The center microcell 670 includes wireless coverage areas 601-606, which correspond to a first, a second, a third, a fourth, a fifth and a sixth sector of the collector cell, respectively.

Since microcell frequency reuse plan 600 is a 1:6:6 frequency plan, each microcell has six sectors and uses six unique frequency bands, a first, a second, a third, a fourth, a fifth and a sixth frequency band. Sectors of each microcell that are labeled with a reference number ending in a "1" use the first frequency band, sectors labeled with a reference number ending in a "2" use the second frequency band, sectors labeled with a reference number ending in a "3" use the third frequency band, sectors labeled with a reference number ending in a "4" use the fourth frequency band, sectors labeled with a reference number ending in a "5" use the fifth frequency band, and sectors labeled with a reference number ending in a "6" use the sixth frequency band. In frequency plan 600, all surrounding neighbor microcells 671, 672, 673, 674, 675 and 676 are denoted with an "X" transmit and receive backhaul traffic to and from a backhaul collector site of the microcell 670. Neighbor microcells 671, 672, 673, 674, 675 and 676 are shown adjacent to the microcell 670 of the backhaul cell, but may not be necessarily the case with other frequency plans.

In FIG. 6A, the six neighbor microcells 671, 672, 673, 674, 675 and 676 which transmit and receive backhaul traffic for three of their respective sectors to and from center microcell 670. Microcell 671 transmits and receives backhaul traffic from sectors 611-616. Microcell 672 transmits and receives backhaul traffic from sectors 621-626. Microcell 673 transmits and receives backhaul traffic from sectors 631-636. Microcell 674 transmits and receives backhaul traffic from sectors 641-646. Microcell 675 transmits and receives backhaul traffic from sectors 651-656. Microcell 676 transmits and receives backhaul traffic from sectors 661-666.

Figure 6B:
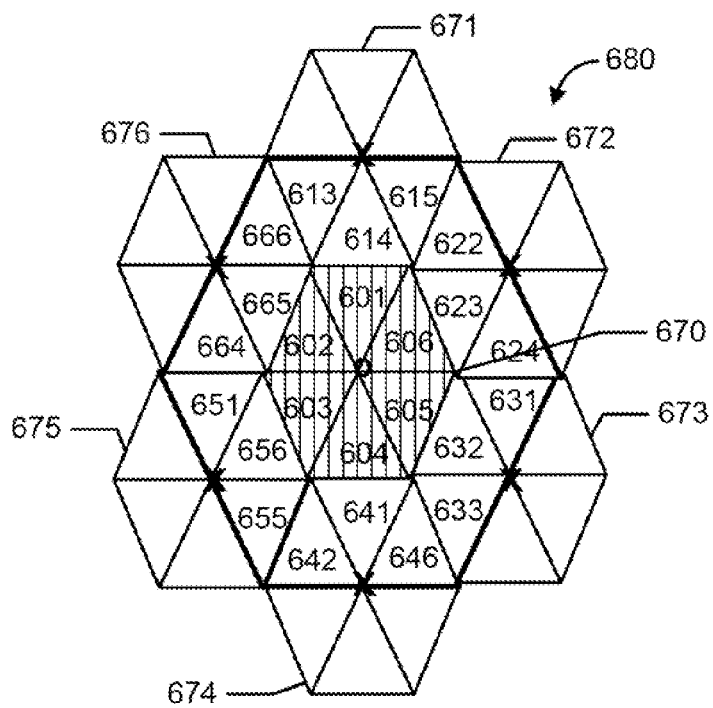
FIG. 6B is a block diagram of a backhaul cell for an intermediate backhaul layer of the 1:6:6 pattern in accordance with one or more embodiments of the present invention.

FIG. 6B is a block diagram of a backhaul cell 680 for an intermediate backhaul layer of the 1:6:6 pattern in accordance with one or more embodiments of the present invention. In FIG. 6B, the reference numerals of those sectors outside of the backhaul cell 680 have been removed. The backhaul traffic from each sector in the backhaul cell 680 is transmitted and received using the frequency band (more specifically, the backhaul portion of the frequency band) associated with that individual sector. For example, backhaul traffic for sector 614 is transmitted and received, to and from the backhaul collector site in the center microcell 670 (shown vertically hatched) using the fourth frequency band. Thus, as depicted in FIG. 6B, backhaul traffic for sectors 613-615, 622-624, 631-633, 641, 642, 646, 651, 656, 655 and 664-666 of neighboring microcells is transmitted and received, to and from backhaul cell 680 using a backhaul portion of the frequency band indicated by the sector's ending reference number digit.

Returning again to FIG. 1, backhaul collector sites 112, 116 and 120 may communicate with backstretch super collector site 105 with two frequency bands of the six frequency bands of the backhaul frequency reuse plan 600 based on the 1:6:6 pattern or with two separate bands different from bands of the microcell frequency reuse plan. Nonetheless, only one frequency band may be used per backhaul collector sites 112, 116 and 120. However, other configuration employing more than three backhaul collector sites may be used depending on the configuration. Additionally, other microcell frequency reuse plans can be used such as a 1:4:2 pattern.

Figure 7A:
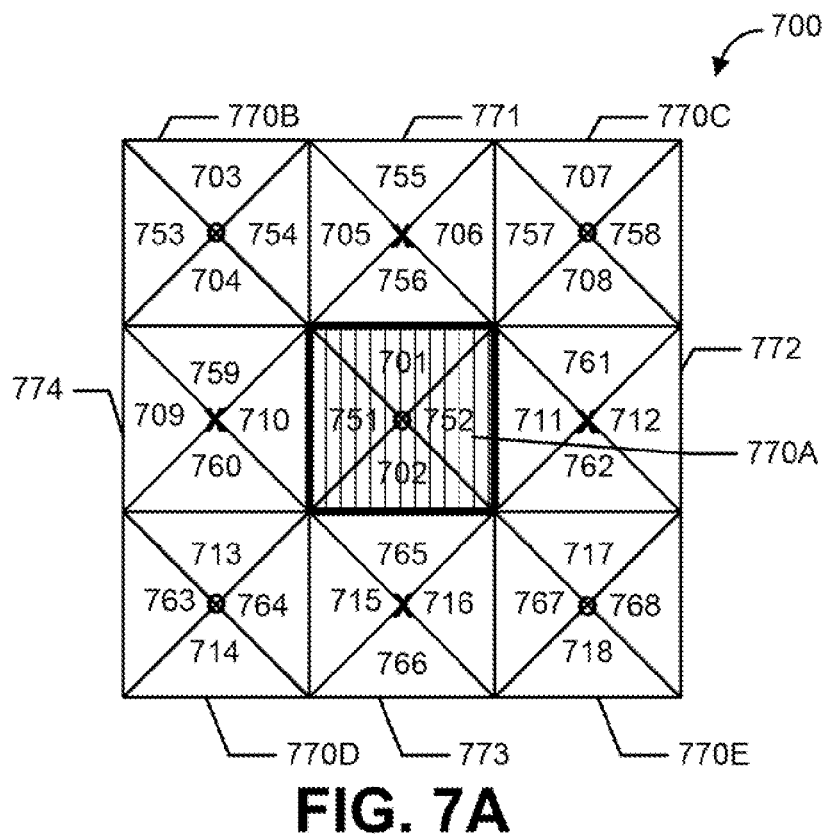
FIG. 7A is a block diagram of a microcell frequency reuse plan of a 1:4:2 pattern for a base microcell layer in accordance with one or more embodiments of the present invention.

FIG. 7A is a block diagram of a microcell frequency reuse plan of a 1:4:2 pattern for a base microcell layer in accordance with one or more embodiments of the present invention. Frequency plan 700 represents an alternative frequency plan with the addition of surrounding backhaul cells (shown by the "O" at various microcell centers). Center microcell 770A is shown vertically hatched and includes wireless coverage areas 701, 751, 702, and 752, which correspond to first, second, third and fourth sectors, respectively.

Since frequency plan 700 is a 1:4:2 frequency plan, each microcell (e.g., microcells 770A, 770B, 770C, 770D, 770E, 771, 772, 773, and 774) has four sectors but uses two unique frequency bands, a first and a second frequency band. Sectors of each microcell that are labeled with a reference number below 750 uses the first frequency band, while sectors labeled with a reference number greater than 750 use the second frequency band. For example, in microcell 770A, sectors 701 and 702 use the first frequency band and sectors 751 and 752 use the second frequency band. In microcell 770B, sectors 703 and 704 use the first frequency band and sectors 753 and 754 use the second frequency band. In microcell 770C, sectors 707 and 708 use the first frequency band and sectors 757 and 758 use the second frequency band. In microcell 770D, sectors 713 and 714 use the first frequency band and sectors 763 and 764 use the second frequency band. In microcell 770E, sectors 717 and 718 use the first frequency band and sectors 767 and 768 use the second frequency band. The center of microcells 770A-770E include a "O" to denote a backhaul collector site at a center of the microcell. These microcells 770A-770E will also serve as a center of a backhaul cell. In the example, only microcell 770A is shown vertically hatched to describe a single backhaul cell represented in FIG. 7B.

In neighbor microcell 771, sectors 705 and 706 use the first frequency band and sectors 755 and 756 use the second frequency band. In neighbor microcell 772, sectors 711 and 712 use the first frequency band and sectors 761 and 762 use the second frequency band. In neighbor microcell 773, sectors 715 and 716 use the first frequency band and sectors 765 and 766 use the second frequency band. In neighbor microcell 774, sectors 709 and 710 use the first frequency band and sectors 759 and 760 use the second frequency band.

In frequency plan 700, an "X" is in the center of each of the plurality of surrounding neighbor microcells 771-774, neighboring microcell 770A to denote a neighbor cell collector site for the corresponding microcell. Each of the plurality of neighbor microcells 771-774 is also a neighbor to one or more of the other backhaul cells corresponding to center microcells 770B-770E. For example, neighbor microcell 771 is a neighbor microcell for those backhaul cells corresponding to center microcells 770A, 770B and 770C. Neighbor microcell 771 is also a neighbor microcell (not shown) for a backhaul cell immediately adjacent sector 755. Thus, neighbor microcell 771 transmits backhaul traffic of a sector bordering a particular backhaul cell using narrowbeam antenna and the particular frequency band of the corresponding sector.

As shown in FIG. 7A, the four neighbor cells (e.g., cells 771-774) of the microcell 770A each transmit and receive backhaul traffic for one of their respective sectors to and from the microcell 770A (serving as a center of a backhaul cell). Furthermore, the backhaul traffic from each sector is transmitted and received using the frequency band (more specifically, the backhaul portion of the frequency band) associated with that individual sector. For example, backhaul traffic for sector 756 in neighbor microcell 771 is transmitted and received, to and from the neighbor cell collector site of the neighbor microcell 771 and to and from microcell 770A using the second frequency band. Thus, as depicted in FIG. 7A, backhaul traffic for sectors 756, 710, 765 and 711 is transmitted and received to and from the microcell 770A using a backhaul portion of the frequency band indicated by the sector's reference number.

Figure 7B:
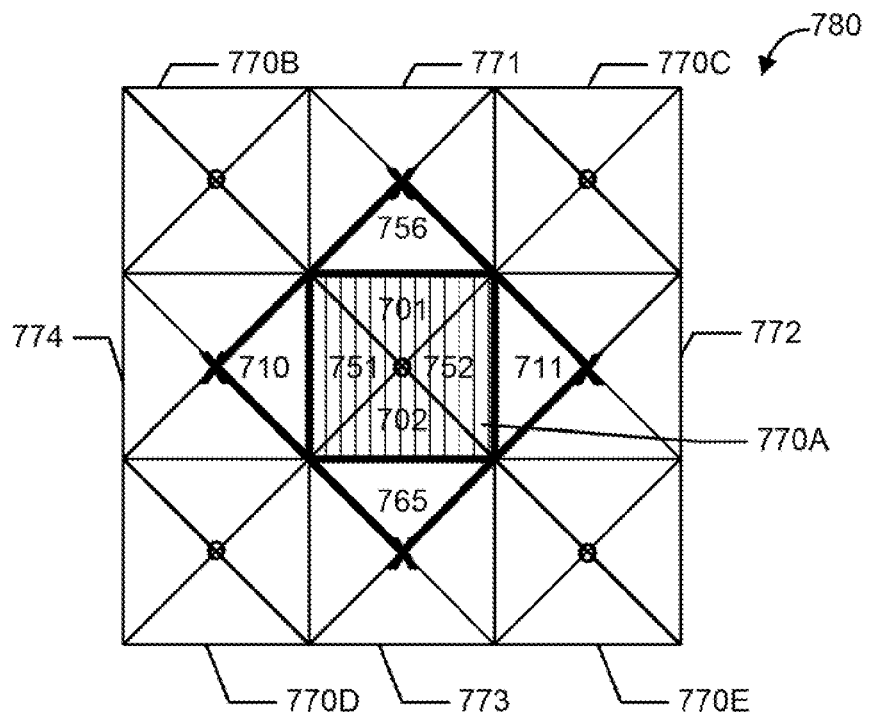
FIG. 7B is block diagram of a backhaul cell for an intermediate backhaul layer of the 1:4:2 pattern in accordance with one or more embodiments of the present invention.

FIG. 7B is block diagram of a backhaul cell 780 for an intermediate backhaul layer of the 1:4:2 pattern in accordance with one or more embodiments of the present invention. The reference numerals of those sectors outside of backhaul cell 780 have been removed. Backhaul cell 780 includes at the center the microcell 770A (shown vertically hatched) having sectors 701, 702, 752 and 751 and sectors 710, 711, 756 and 765 of neighboring microcells 774, 772, 771 and 773, respectively. The backhaul traffic to the backhaul collector site in microcell 770A from sector 710 originates from neighbor microcell 774 using the backhaul portion of the first frequency band. The backhaul traffic to the backhaul collector site in microcell 770A from sector 711 originates from neighbor microcell 772 using the backhaul portion of the first frequency band. The neighbor cell collection sites associated with sectors 710 and 711 are displaced from each other. The backhaul traffic to the backhaul collector site in microcell 770A from sector 756 originates from neighbor microcell 771 using the backhaul portion of the second frequency band. The backhaul traffic to the backhaul collector site in microcell 770A from sector 765 originates from neighbor microcell 773 using the backhaul portion of the second frequency band. The neighbor cell collection sites associated with sectors 771 and 773 are displaced from each other.

Figure 8:
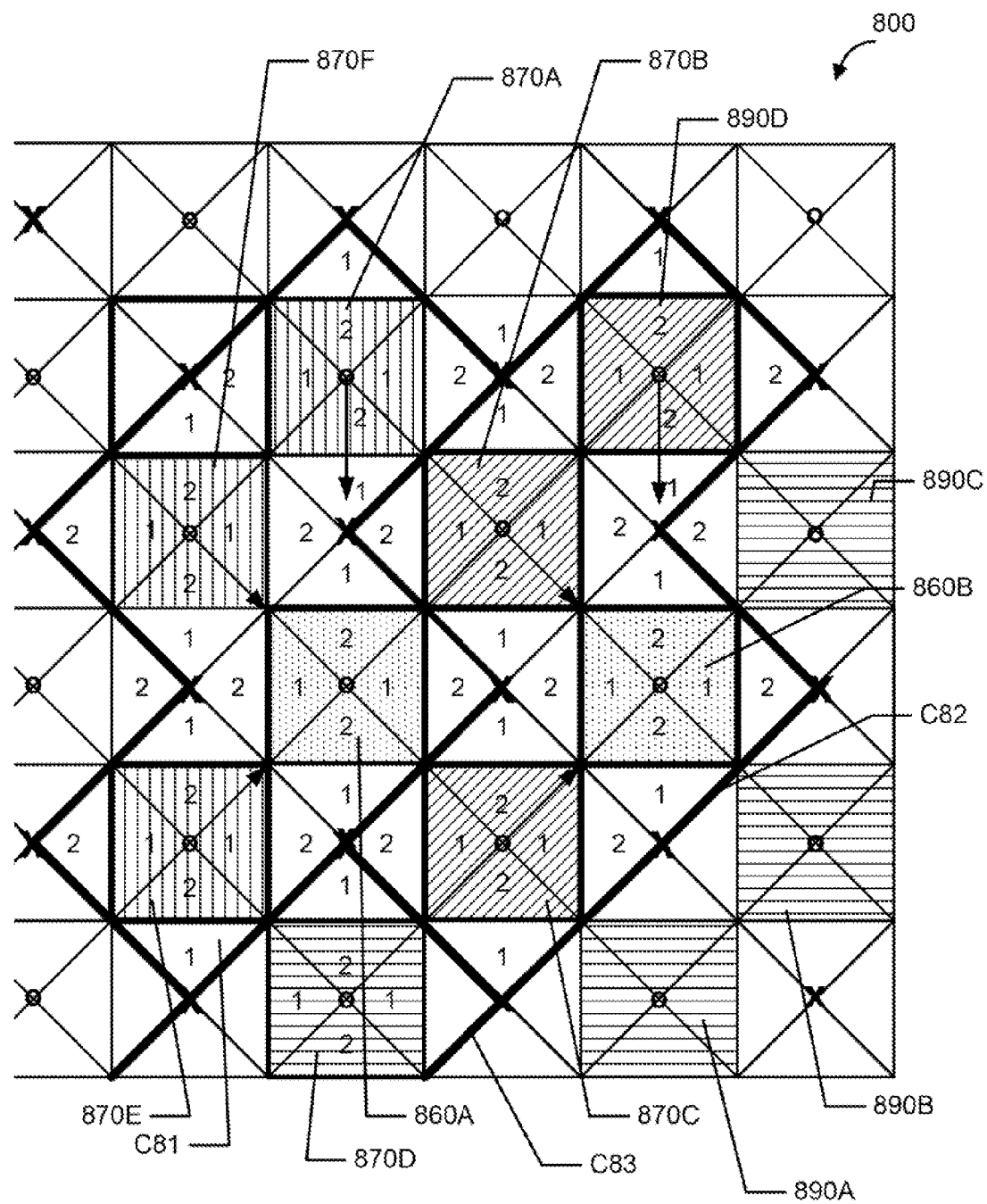
FIG. 8 is a block diagram of a backstretch cell plan for a third backstretch layer of the 1:4:2 pattern in accordance with one or more embodiments of the present invention.

FIG. 8 is a block diagram of a backstretch cell plan 800 for a third backstretch layer of the 1:4:2 pattern in accordance with one or more embodiments of the present invention backstretch cell plan 800 includes a plurality of backstretch cells of which backstretch cells C81 and C82 are shown in full. The backstretch cells C81 and C82 have a generally backward "Z" shape. However, other shapes may be used.

A backstretch cell, such as backstretch cell C81 includes a backhaul cell 860A (with the center microcell shown hatched with a dotted pattern) surrounded by a plurality of neighbor backhaul cells 870A, 870B, 870C, 870D, 870E and 870F. A subset of the plurality (set) of neighbor backhaul cells 870A, 870B, 870C, 870D, 870E and 870F transmit and receive backhaul traffic to and from the backstretch super collector site in the center microcell shown hatched with a dotted pattern of backhaul cell 860A. The reference numerals for backhaul cells 870A, 870B, 870C, 870D, 870E and 870F is shown pointing to the center microcell having the backhaul collector site denoted with an "O". Each center microcell (shown vertically hatched) of backhaul cells 870A, 870F, and 870E includes a backhaul collector site in communication with the backstretch collector site of backstretch cell C81 located in the microcell (shown hatched with a dotted pattern) of backhaul cell 860A. Backhaul cells 870A, 870F, and 870E are a subset of the plurality (set) of neighbor (adjacent) backhaul cells 870A, 870B, 870C, 870D, 870E and 870F. The other remaining backhaul cells 870B and 870C (with a center microcell shown hatched with a diagonal pattern) of the set direct the collected backhaul traffic into backstretch cells C82. Backhaul cell 870D has a center microcell (shown hatched with a horizontal pattern) which directs collected backhaul traffic into a backstretch cell that is different from C81 and C82.

Backstretch traffic is the backhaul traffic collected and retransmitted by a subset of neighbor (or adjacent) backhaul cells surrounding a central backhaul cell of a backstretch cell, (e.g. backstretch cell C81). The subset of neighbor backhaul cells transmit and receive the backstretch traffic to and from a super collector site at the center of the microcell (hatched with the dotted pattern). Thus, the backhaul traffic in backstretch cell C81 is collected from neighbor (or adjacent) backhaul cells 870A, 870E, and 870F as well as the traffic collected in backhaul cell 860A. The sectors numbers "1" and "2" correspond to a first frequency band and a second frequency band.

Backhaul cells 870A, 870E, and 870F would use one of the first and second frequency bands in alternating arrangement. For example, backhaul cell 870A may use a first frequency band. Backhaul cell 870E may use a second frequency band. Backhaul cell 870F may reuse the first frequency band. Backstretch cells are super cells created by collecting backhaul traffic from a center backhaul cell with eight (8) sectors and a subset of backhaul cells. In one embodiment, three (3) neighbor backhaul cells with eight (8) sectors are combined with the eight (8) sectors of the center backhaul cell for a total of 8+(3*8)=32 sectors.

Backstretch cell C82 includes a backhaul cell 860B (with the center microcell shown hatched with a dotted pattern) surrounded by a plurality of neighbor backhaul cells 870B, 870C, 890A, 890B. 890C and 890D. A subset of the plurality (set) of neighbor backhaul cells 870B, 870C, 890A, 890B. 890C and 890D transmit and receive backhaul traffic to and from the backstretch super collector site, denoted by a "O", in the center microcell (shown hatched with a dotted pattern) of backhaul cell 860B. The reference numerals for backhaul cells 870B, 870C, 890A, 890B, 890C and 890D is shown pointing to the center microcell having the backhaul collector site denoted with an "O". Each center microcell (shown diagonally hatched) of backhaul cells 870B, 870C, and 890D includes a backhaul collector site in communication with the backstretch collector site of backstretch cell C82 located in the microcell (shown hatched with a dotted pattern) of backhaul cell 860B. Backhaul cells 870B, 870C, and 890D are a subset of the plurality (set) of neighbor backhaul cells 870B, 870C, 890A, 890B, 890C and 890D. Backhaul cells 870B and 870C also surround and are neighbor to backhaul cells of another backstretch cell C81. The other remaining backhaul cells 890A, 890B and 890C (with a center microcell shown horizontally hatched) of the set direct the collected backhaul traffic into different backstretch cells. The set of backhaul cells associated with a respective one backstretch super collector site form a backward "Z" shape with the backstretch super collector site centrally positioned.

Figure 9:
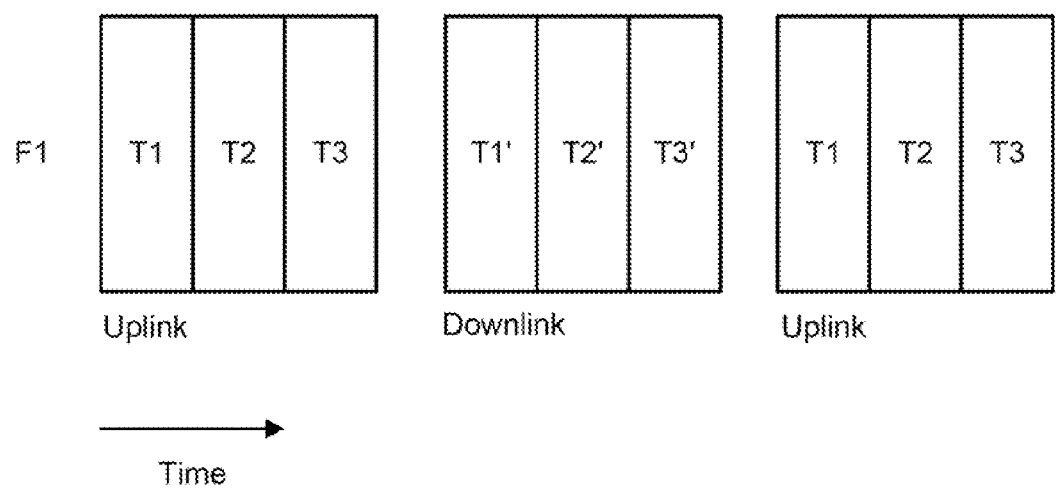
FIG. 9 is a point-to-multipoint backstretch resource allocation using TDD.

FIG. 9 is a point-to-multipoint (PMP) backstretch resource allocation using TDD. The backstretch resource allocation will be described in relation to the configuration of the backstretch cell plan of FIG. 3. For a PMP mode, the backstretch resource allocation for a first backhaul cell (e.g., backhaul cell 370B) of a set may include time slot resource T1 for the uplink and time slot resource T1' for the downlink on a signal frequency resource F1. For a second backhaul cell (e.g., backhaul cell 370D) of the set, the backstretch resource allocation would include time slot resource T2 for the uplink and time slot resource T2' for the downlink on the same frequency resource F1. Likewise, for a third backhaul cell (e.g., backhaul cell 370F) of the set, the backstretch resource allocation would include time slot resource T3 for the uplink and time slot resource T3' for the downlink on the same frequency resource F1.

Figure 10:
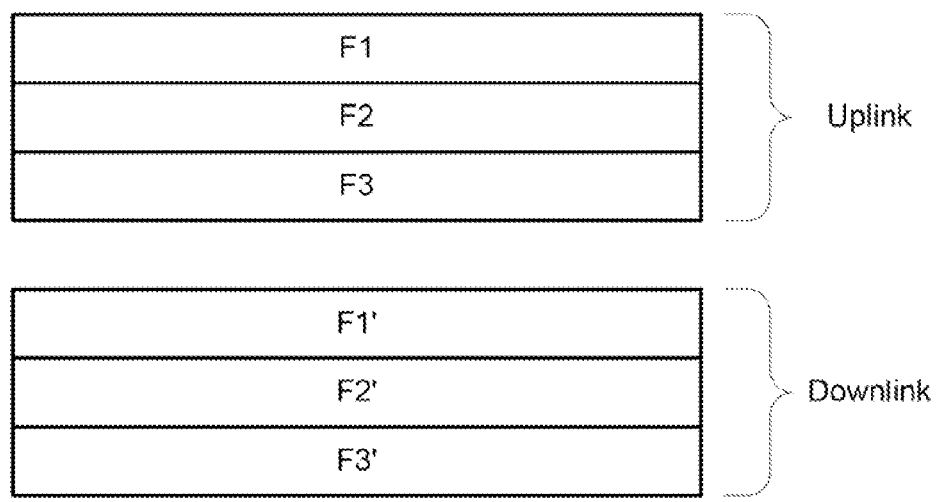
FIG. 10 is a point-to-point backstretch resource allocation using FDD.

FIG. 10 is a point-to-point backstretch resource allocation using FDD in the configuration of the backstretch cell plan of FIG. 3. For a PP mode, the backstretch resource allocation for a first backhaul cell (e.g., backhaul cell 370B) of a set may include frequency resource F1 for the uplink and frequency resource F1' for the downlink. For a second backhaul cell (e.g., backhaul cell 370D) of the set, the backstretch resource allocation would include frequency resource F2 for the uplink and frequency resource F2' for the downlink. Likewise, for a third backhaul cell (e.g., backhaul cell 370F) of the set, the backstretch resource allocation would include frequency resource F3 for the uplink and frequency resource F3' for the downlink.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing in-band wireless backstretch communications for a plurality of backstretch cells comprising:

transmitting and receiving backhaul traffic, by a plurality of backhaul collector sites, to and from transceivers associated with sectors of a frequency reuse plan using a backhaul portion thereof;

transmitting and receiving the backhaul traffic, at a backstretch super collector site, to and from a subset of backhaul collector sites of a plurality of backhaul collector sites adjacent to the backstretch super collector site associated with a corresponding backstretch cell;

transmitting and receiving user traffic, by the backstretch super collector site, to and from remote stations within a central microcell of the backstretch cell using a user portion of a plurality of frequency bands of the frequency reuse plan; and transmitting and receiving the backhaul traffic, by the backstretch super collector site, to and from adjacent collector sites of surrounding microcells adjacent to the central microcell using the backhaul portion of the plurality of frequency bands wherein the transmitting of the backhaul traffic includes transmitting a narrowbeam by the subset of backhaul collector sites to the backstretch super collector site associated with the corresponding backstretch cell, the subset of backhaul collector sites includes every other backhaul collector site surrounding the backstretch super collector site associated with the corresponding backstretch cell or backhaul collector sites surrounding the backstretch super collector site which form a backward Z.

2. The method of claim 1, wherein the transmitting comprises transmitting the backhaul traffic compatible with a Orthogonal Frequency Division Multiplexed (OFDM) physical layer or a frequency division multiple access (FDMA) design and eliminating a media access control (MAC) layer.

3. The method of claim 1, further comprising:

transmitting and receiving by each backstretch super collector site to and from a terrestrial network via at least one of wire, fiber or wireless connection.

4. The method of claim 1, further comprising:

transmitting and receiving by each remaining backhaul collector site of the plurality of backhaul collector sites in a direction that is different from immediately adjacent backhaul collector sites of the subset of backhaul collector sites and to a different backstretch super collector site of a different backstretch cell.

5. A system for providing in-band wireless backstretch communications for a plurality of backstretch cells comprising:

a plurality of backhaul collector sites configured to transmit and receive backhaul traffic to and from transceivers associated with sectors of a frequency reuse plan using a backhaul portion thereof; and a backstretch super collector site configured to transmit and receive the backhaul traffic to and from a subset of backhaul collector sites of a plurality of backhaul collector sites adjacent to the backstretch super collector site associated with a corresponding backstretch cell wherein the backstretch super collector site comprising an access transceiver configured to transmit and receive traffic to and from remote stations within a central microcell of the backstretch cell using a user portion of a plurality of frequency bands of the frequency reuse plan and backhaul transceivers configured to transmit and receive backhaul traffic to and from adjacent collector sites of surrounding microcells adjacent to the central microcell using the backhaul portion of the plurality of frequency bands and a directional antenna coupled to each backhaul collector site of the plurality of backhaul collector sites, the directional antenna of the subset of backhaul collector sites configured to transmit a narrowbeam to the backstretch super collector site of the corresponding backstretch cell, the subset of backhaul collector sites includes every other backhaul collector site surrounding the backstretch super collector site associated with the corresponding backstretch cell or backhaul collector sites surrounding the backstretch super collector site which form a backward Z.

6. The system of claim 5, wherein the backhaul transceivers transmit the backhaul traffic compatible with an Orthogonal Frequency Division Multiplexed (OFDM) physical layer or a frequency division multiple access (FDMA) design and eliminate a media access control (MAC) layer.

7. The system of claim 5, wherein the backstretch super collector site further comprises a network router configured to route signals received by the backstretch super collector site to a terrestrial network via at least one of wire, fiber or wireless connection.

8. The system of claim 5, each remaining backhaul collector site of the plurality of backhaul collector sites transmits in a direction that is different from immediately adjacent backhaul collector sites of the subset of backhaul collector sites and to a different backstretch super collector site of a different backstretch cell.

9. The system of claim 5, wherein the frequency reuse plan comprises a 1:3:3 frequency reuse pattern, a 1:4:2 frequency reuse pattern or a 1:6:6 frequency reuse pattern employing an Orthogonal Frequency Division Multiplex (OFDM) physical layer.

* * * * *